March 5, 1968  H. N. FAIRBANKS ET AL  3,371,884
CASSETTE
Filed Aug. 4, 1966
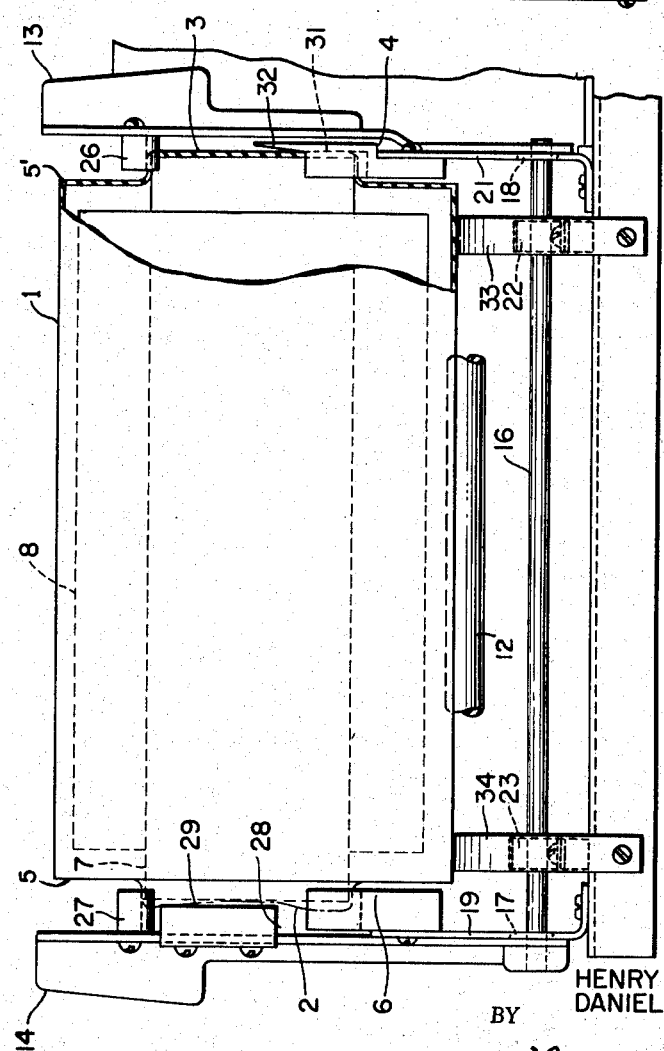
INVENTORS.
HENRY N. FAIRBANKS
DANIEL H. ROBBINS
BY
Robert L. Nathans
ATTORNEY

United States Patent Office 3,371,884
Patented Mar. 5, 1968

3,371,884
CASSETTE
Henry N. Fairbanks and Daniel H. Robbins, Rochester, N.Y., assignors to Itek Corporation, Lexington, Mass., a corporation of Delaware
Filed Aug. 4, 1966, Ser. No. 570,209
16 Claims. (Cl. 242—71.1)

ABSTRACT OF THE DISCLOSURE

A specially designed "throwaway" cassette is disclosed which is particularly well adapted for storing large amounts of photosensitive web material to be fed into a photocopy machine. The cassette configuration is such that a cassette-mounted roller is not needed and the web driving force remains constant as the material is consumed. A rubber roller external to the cartridge coacts with a bearing surface on the cartridge for driving the strip material from the cartridge.

---

The present invention relates to film cartridges or cassettes and more particularly to large cassettes containing web material such as photographic film or photosensitive printing material.

It is desirable to manufacture large cassettes containing hundreds of feet of a photosensitive web media having widths of nine inches or more. Such cassettes should be rugged enough for short term use, and yet be inexpensive to manufacture. Additionally, it is preferable that the cassettes possess certain advantages relative to known cassettes as will be set forth hereinafter.

Accordingly, it is the principal object of the present invention to provide a new and improved cassette or cartridge for storing photosensitive web material which could be utilized in a camera, photocopying, or plate making machine.

It is a further object of the present invention to provide a new and improved cassette of relatively large size which is inexpensive to manufacture and accordingly may be thrown away after the photosensitive media contained therein has been exhausted.

It is a further object of the present invention to provide a cartridge arrangement having a constant pulling force applied to the film to be withdrawn therefrom regardless of the weight of the film contained within the cartridge.

Other objects and advantages of the present invention will in part appear hereinafter or will in part be apparent to those well skilled in the art.

FIGURE 1 discloses a front view of a preferred embodiment of the present invention.

FIGURE 2 discloses a side view of a preferred embodiment of the present invention.

In accordance with a first feature of the present invention a cassette having a film feed lip is positioned adjacent a roller bearing surface which is spring biased against a single very soft rubber roller external to the cassette which pulls the film from the cassette when driven. This special roller is selected to cause the co-efficient of friction of the roller-film combination to be very high relative to the coefficient of friction of the film-bearing surface combination so that the film is positively driven from the cassette with one roller rather than the usual arrangement of two rollers. The elimination of a cassette mounted roller is of considerable significance since the "throw away" cassette of the present invention should be inexpensive to manufacture.

In accordance with additional features of the present invention a cassette having flexible end hub portions is pivotally cradled within supporting nests. These hubs act as locating elements and as bearings to support the rotatable film spool within the cassette. The end wall of one hub is positioned adjacent a vertical locating shoulder plate affixed to the photocopy machine while a spring or a rigid end member presses against the end portion of the other flexible hub to spring load the spool and accurately locate the longitudinal spool axis exactly perpendicular to the plate and the film feed path. The advantages of spring loading the spool along its longitudinal axis are set forth in U.S. patent application No. 514,957 of Henry Fairbanks and Thomas Madigan filed Dec. 20, 1965, now Patent No. 3,341,146, and assigned to the same assignee as the present invention. In that application a biasing spring was provided within each cassette to end load the spool. The present cassette, however, is intended to be a "throw away" item so that the cost of providing a spring arrangement within each cassette becomes prohibitive. The problem has been eliminated by forming the hub portions of a material such as plastic having flexible terminal portions which function as the aforesaid spring thereby to further effect considerable savings in mass production costs. The special cassette of the present invention is loaded into the photocopier by placing the cassette hubs into support nests and positioning curved downwardly spring loaded seating members over the hubs to grip the upper hub surfaces and positively seat the hubs in the nests. A pressure spring causes the cassete to turn relative to the nests and seating members thereby to spring load the aforesaid cassette bearing surface against the soft roller to establish the proper film driving force. The spool becomes quite a few pounds lighter as the film is consumed. However, this change in spool weight causes no detrimental change in the normal roller force and hence the driving force because the change in spool weight is balanced about the cassette pivot point. A pair of elongated film guards straddle the roller bearing surface to protect the short length of cut off film emerging from the feed lip upon removal of the cassette from the photocopy machine, where the film supply has not been completely consumed. In the absence of the protective film guards the film would be more exposed to the risks of being bent or folded which in turn could cause jamming of the copy machine after the cassette is replaced.

As disclosed in the figures a film cartridge or cassette 1 having hollow hub portions 2 and 3 mounted upon first and second side wall portions 5 and 5' is shown seated in supporting nests 4 and 6. A cylindrical core 7 having a roll of photosensitive web material 8 wound thereon is supported within the hollow hub portions 2 and 3. A film feed orifice 9 is positioned adjacent bearing surface 11. Orifice 9 contains conventional velvet brushes or lips which prevent light from entering the cartridge. A film drive roller 12 is shown pressed against bearing surface 11 and when rotated pulls the film from the cassette. Pivotable cartridge seating members 13 and 14 are rigidly affixed to cylindrical bar 16 which bar passes through elongated slots 17 and 18 formed within vertical brackets 19 and 21. Bar 16 is downwardly spring biased by leaf springs 22 and 23. Cartridge 1 is removed from the support nests by pivoting seating members 13 and 14 in the direction of arrow 24 after the operator pulls upwardly on the handles so that the curved portions 26 and 27 clear the upper portion of hub members 2 and 3. A cartridge is seated in the machine after the pivotable seating members 13 and 14 have been moved to one side. After the hubs are positioned within their nests as shown in the drawings, the spring loaded seating members 13 and 14 are moved to a vertical position while being vertically displaced against the action of the springs 22 and 23 so as to clear the upper hub portions. The side walls of the hubs are intentionally designed to be thin and flexible so that when seating member 14 becomes vertically orientated a pressure plate 28 affixed thereto causes a flexible wall 29 of cassette 1 to be pressed firmly against the end of core 7 to in turn cause the opposite end of core 7 to be pressed flush against vertical positioning surface 31. This causes the longitudinal core axis to be perpendicular to pressure plate surface 31 which in turn insures that the film feed path is maintained perpendicular to the longitudinal axis as mentioned herein above. The positioning plate portion of nest 4 is tapered at 32 to facilitate the insertion of the cartridge into the supporting structure. Leaf springs 33 and 34 cause the cartridge to rotate in nests 4 and 6 to in turn cause bearing surface 11 to be pressed against roller 12.

The preferred embodiment of the invention contains a spool of film which may weigh in the neighborhood of ten pounds. However, as the material is consumed the sharp reduction in the weight of the material does not affect the normal bearing surface force exerted on roller 12 because these gravitational or torque changes are balanced about vertical axis 36 so that the normal force is for all practical purposes a function of the position and stiffness of springs 33 and 34.

In accordance with the aforesaid desirability of eliminating a cartridge mounted roller a single extra soft rubber roller is utilized in conjunction with the bearing surface 11 of the cartridge. This arrangement has not been used in the past because a sufficient driving force was not generated by using a single roller. However, in accordance with one aspect of the invention a single very soft rubber roller is sufficient to pull the film from the cartridge where the coefficient of friction of the roller-film combination is designed to be at least twice as great as the coefficient of friction of the film-bearing surface combination. Since the soft roller is part of photocopy machine it can be seen that no rollers need be mounted upon the "throw away" cassette.

While there has been presented what is at present considered to be the preferred embodiment of the invention, it will be apparent to those of ordinary skill in the art that many and various changes and modifications may be made without departing from the spirit of the invention. It will be understood, therefore, that all changes and modifications as fall fairly within the scope of the present invention, as defined in the appended claims, are to be described as a part of the present invention.

We claim:
1. In combination:
   (a) a cartridge for storing web material;
   (b) a feed orifice;
   (c) a bearing surface adjacent said feed orifice;
   (d) a roller external to said cartridge coacting with said bearing surface for driving said material from said cartridge, the ratio of the coefficient of friction of the roller-material surface combination over the coefficient of friction of the material-bearing surface combination being greater than two and;
   (e) means for biasing said roller against said bearing surface.
2. The combination as set forth in claim 1 wherein said web material is a photosensitive media having its emulsion side in contact with said roller.
3. The combination as set forth in claim 2 wherein said roller is made of a soft deformable material.
4. In combination:
   (a) a cartridge including an elongated core positioned therein for supporting web material, said cartridge also including a feed orifice and a bearing surface adjacent thereto;
   (b) first support means for rotatably supporting said core within said cartridge;
   (c) second support means for rotatably supporting said cartridge;
   (d) a roller external said cartridge and coacting with said bearing surface for driving said web material from said cartridge and;
   (e) actuating means for rotating said cartridge within said second support means to cause the bearing surface of said cartridge to be mechanically biased against said roller.
5. In combination:
   (a) a cartridge including an elongated core positioned therein for supporting web material, said cartridge having terminal portions at opposite ends thereof for rotatably supporting said core within said cartridge, at least one of said terminal portions having a flexible wall, said cartridge also including a feed orifice and a bearing surface adjacent thereto;
   (b) support means for rotatably supporting said cartridge;
   (c) a roller external said cartridge and coacting with said bearing surface for driving said web material from said cartridge;
   (d) actuating means for applying rotary torque to said cartridge to cause the bearing surface to said cartridge to be mechanically biased against said roller; and
   (e) means for inwardly deflecting said flexible wall to properly orient the longitudinal axis of said core.
6. The combination as set forth in claim 5 wherein said terminal portions comprise hollow hubs.
7. The combination as set forth in claim 5 further including a cartridge positioning plate positioned adjacent one terminal portion, means for deflecting the flexible wall of the other of said terminal portions in a direction toward the interior of said cartridge to cause said core and said one terminal portion to be pressed flush against said positioning plate to cause the longitudinal axis of said core to be perpendicular to the surface of said positioning plate.
8. The combination as set forth in claim 7 wherein a portion of said positioning plate is tapered to facilitate the seating of said cartridge within said support means.
9. The combination as set forth in claim 7 wherein said actuating means comprising a spring which presses against the cartridge when said cartridge is seated within said support means to cause the bearing surface of said cartridge to be mechanically biased against said roller.
10. In combination:
    (a) a cartridge including an elongated core positioned therein for supporting web material, said cartridge having terminal portions at opposite ends thereof for rotatably supporting said core within said cartridge, at least one of said terminal portions having a flexible wall, said cartridge also including a feed orifice and a bearing surface adjacent thereto;
    (b) support means for rotatably supporting said cartridge;
    (c) a soft roller external said cartridge and coacting with said bearing surface for driving said web material from said cartridge, the ratio of the coefficient of friction of the roller-material surface combination over the coefficient of friction of the material-bearing surface combination being greater than two;
    (d) actuating means for applying rotary torque to said cartridge to cause the bearing surface to said cartridge to be mechanically biased against said roller and;
    (e) means for inwardly deflecting said flexible wall to properly orient the longitudinal axis of said core.
11. The combination as set forth in claim 10 further including a cartridge positioning plate positioned adjacent one terminal portion, means for deflecting the flexible wall of the other of said terminal portions in a direction toward the interior of said cartridge for causing said core and said one terminal portion to be pressed flush against said positioning plate to cause the longitudinal axis of said core to be perpendicular to the surface.
12. The combination as set forth in claim 11 wherein a portion of said positioning plate is tapered to facilitate the seating of said cartridge within said support means.

13. The combination as set forth in claim 11 wherein said actuating means comprising a spring which presses against the cartridge when said cartridge is seated within said support means for causing the bearing surface of said cartridge to press against said roller.

14. In combination:
 (a) a cartridge including an elongated core for supporting web material to be fed from said cartridge positioned therein, said cartridge having hollow cylindrical hubs at terminal portions thereof for supporting the ends of said core, the walls of said hubs being flexible, said cartridge also including a feed orifice having a bearing surface adjacent thereto;
 (b) a support means for rotatably supporting said hubs;
 (c) a soft roller external said cartridge and coacting with said bearing surface for driving said web material from said cartridge;
 (d) actuating means for applying torque to said cartridge for causing said hubs to rotate in said support means and for causing the bearing surface of said cartridge to be mechanically biased against said roller;
 (e) a tapered cartridge positioning plate positioned adjacent at least a portion of the surface of one of said hubs;
 (f) means for inwardly deflecting the flexible wall of the other of said hubs to cause the core and the cartridge to be pressed flush against said tapered positioning plate; and
 (g) and a pair of spring loaded pivotable seating members resiliently urging said cylindrical hubs into said support means.

15. A cassette for containing a spool of a photosensitive medium mounted upon an elongated core having a longitudinal axis comprising:
 (a) an elongated light tight container having first and second side wall portions substantially perpendicular to said longitudinal axis of said core at opposite ends thereof and having a bottom portion including a bearing surface for coacting with a drive roller for driving said photosensitive media from said cassette;
 (b) an elongated feed orifice positioned at said bottom portion of said cassette intermediate said bearing surface and the interior of said cassette for enabling said photosensitive media to pass from the interior of said cassette to said bearing surface;
 (c) first and second cylindrical hub portions positioned upon said first and second side wall portions respectively and extending outwardly therefrom for rotatably supporting said elongated core about said longitudinal axis thereof to facilitate feeding of said photosensitive media through said feed orifice and for rotatively supporting said first and second side wall portions of said container on external members so that changes in the weight of said spool of photosensitive media are balanced about the longitudinal axis of said core thereby to maintain the driving roller force at said bearing surface substantially constant regardless of said changes in the weight of said spool.

16. The combination as set forth in claim 15 wherein said first and second cylindrical hub portions have hollowed out cylindrical cavities therein and said elongated core has first and second terminal portions extending beyond said spool of photosensitive media and positioned within said cylindrical hub portion cavities for rotatably supporting said elongated core.

References Cited
UNITED STATES PATENTS

| | | | |
|---|---|---|---|
| 1,832,277 | 11/1931 | Caps | 242—71.1 X |
| 2,191,849 | 2/1940 | Debrie | 242—71.1 |

FRANK J. COHEN, *Primary Examiner.*

NATHAN L. MINTZ, *Assistant Examiner.*